United States Patent
Bachinger et al.

(10) Patent No.: US 6,197,365 B1
(45) Date of Patent: *Mar. 6, 2001

(54) PROCESS FOR MANUFACTURING A CATALYTIC MATERIAL

(75) Inventors: Patrick Bachinger, Lenningen; Christian Duelk, Unterpleichfeld; Berthold Keppler, Kirchheim/Teck; Thomas Stengel, Friedrichshafen; Dagmar Waidelich, Winnenden-Hanweiler, all of (DE)

(73) Assignee: Xcellsis GmbH, Kirchheim/Teck-Nabern (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,326

(22) Filed: Mar. 30, 1999

(51) Int. Cl.[7] ............... B05D 3/02; B05D 1/32; B05D 1/02
(52) U.S. Cl. ............ 427/115; 427/282; 427/287; 427/288; 427/314; 427/318; 427/424; 427/427
(58) Field of Search ................. 427/282, 287, 427/288, 115, 421, 424, 427, 483, 314, 318, 226, 236, 245, 229; 502/439

(56) References Cited

U.S. PATENT DOCUMENTS

| 4,129,434 | * | 12/1978 | Plumat et al. . |
| 4,242,374 | * | 12/1980 | Sarsregret . |
| 4,713,363 | * | 12/1987 | Hueul . |
| 4,849,253 | * | 7/1989 | Maricle et al. . |
| 5,547,911 | * | 8/1996 | Grot . |
| 5,741,558 | * | 4/1998 | Otani et al. . |
| 5,795,841 | * | 8/1998 | Kurschner et al. . |

FOREIGN PATENT DOCUMENTS

| 1642921C3 | * | 6/1971 | (DE) . |
| 2526238A1 | * | 1/1976 | (DE) . |
| 2947702A1 | * | 6/1980 | (DE) . |

* cited by examiner

Primary Examiner—Fred J. Parker
(74) Attorney, Agent, or Firm—Evenson, McKeown, Edwards & Lenahan, P.L.L.C.

(57) ABSTRACT

A method for manufacturing a catalytic converter includes spraying a suspension comprising a solvent and a catalyst material comprising carrier particles coated with a catalytically active material onto a substrate having a temperature above the boiling point of the solvent via a sprayer; and forming a layer on the substrate. The layer is thermally activated and is wetted three-dimensionally.

22 Claims, 3 Drawing Sheets

PROCESS FOR MANUFACTURING A CATALYTIC MATERIAL

BACKGROUND AND SUMMARY OF THE INVENTION

The present invention is directed to a method for manufacturing a catalytic converter.

DE 16 42 921 C3 teaches a method of placing a honey-like suspension on spherical steatite carriers. The suspension contains a solvent and a mixture of finely-divided suspended titanium dioxide and a dissolved vanadium compound or dissolved vanadium pentoxide. The spheres may be primed, placed in a heated container (e.g., a coating drum), and sprayed with the suspension while the spheres are moved in the vessel. The solvent evaporates from the suspension during this process leaving behind a dried layer containing vanadium pentoxide and titanium dioxide.

It is also known that catalytic converters (e.g., exhaust catalytic converters for motor vehicles or chemical reactors) can be made by coating a substrate with a catalyst material. A basic body is contacted with a slurry for example, which contains fine-grained catalytically active material and an organic or inorganic solvent (e.g., by dipping or wetting, or rolling in a powdered catalyst material in the moistened state). Methods of this type are described in DE 29 47 702 A1 and DE 25 26 238 A1. To produce sufficient adhesion between the catalyst material and the substrate, it is known that the substrate can be provided with an adhesion promoter layer before coating. The thickness of this adhesion layer is generally approximately 10 $\mu$m. Without an adhesion promoter, adhesion of the catalyst layer is often insufficient. The solvent is then released by heating the coated substrate.

Although the known methods are technically simple, the catalyst layers produced have a number of disadvantages.

Coating is completely nonselective with regard to the coating location and the quantity of catalyst material applied to the substrate. To produce sufficient adhesion between the coating and the substrate, it is often necessary to apply an additional adhesion promoter or a primer (e.g., a wash coat), before the coating. Nevertheless, adhesion under operating conditions is often defective despite this adhesion promoter. In dip-coated exhaust gas catalytic converters for automobiles, significant losses of catalyst material are observed after a fairly lengthy operating time. The catalyst layer erodes during operation. Further, such dipped layers are not impact-proof. If they are subjected to mechanical impacts, the catalyst material separates from the substrate. Also, the adhesion promoter layer impairs the heat bond between the catalyst material and the substrate.

Moreover, not every substrate can be coated. A metallic steel substrate generally oxidizes before the coating process at high temperatures. Aluminum-containing steel, for example, forms a thick layer of aluminum oxide at the surface. The rough oxidized surface that forms improves the adhesion of the layer. However, this cannot be used with aluminum-free stainless steel (VA).

When the basic bodies forming the substrate are uneven or structured, it is practically impossible to create a uniform layer thickness because wetting of the substrate depends on its geometry and on the surface tension of the coating material. Even with flat substrates, however, the thickness of the coating is insufficiently uniform because the thickness of dip-coats increases outward toward the edge. Significant inhomgeneity of the coating is observed not only in the lateral direction but also in the vertical direction. Larger-diameter or heavier grains sink as the material dries, making the particle-size distribution in the deposited layer fundamentally nonuniform. Nor is it possible to establish a concentration profile of the catalytically active material along a lengthwise direction of the substrate.

The object of the present invention is to provide a method for manufacturing a catalytic converter that makes it possible to deposit a catalyst material with a large surface area and good adhesion on a substrate, and which dispenses with additional adhesion promoter layers.

This object is achieved in a method according to the present invention in which a catalytic converter is made by spraying a layer of catalyst material onto a metal substrate using a sprayer. For this purpose, the catalyst material is mixed with a solvent, preferably a solvent that forms a suspension with the catalyst. The catalyst material is then sprayed onto the substrate, which has been heated to a preset temperature. The catalyst material is present in the suspension as carrier particles coated with catalytically active material.

The method according to the present invention makes it possible to manufacture a catalytic converter distinguished by contour-conforming coating of a substrate and also makes it possible to differentiate the layer locally in terms of its geometric and chemical properties. This makes it simple to establish a concentration gradient of the catalytically active material and locally differentiated coating in broad areas. The catalytic converter manufactured according to the present invention is also characterized by significantly improved adhesion of the coating to the substrate and improved erosion resistance by comparison to catalytic converters made by the traditional dip process. In particular, the layers deposited according to the present invention are impact resistant. It is also possible to solder sheet metal coated according to the present invention at temperatures of approximately 1000° C. without the catalyst layer flaking off. Further, since adhesion promoter layers are unnecessary, the heat bond between the catalyst material and the substrate is very good.

Preferably, the substrate temperature during spraying is set so that the solvent evaporates rapidly when the sprayed material touches the substrate. This fixes the coating material locally so that it can no longer flow and creep on the surface of the substrate. At the same time, separation of the coating according to the size and/or weight of the particles is prevented.

Preferably, the solvent is polar. More preferably, the solvent is water. The advantage of this is that water is a medium that is simple and nonproblematical to handle.

It is particularly advantageous to move the substrate and the sprayer relative to one another, preferably parallel to one another. The movement can be adjusted such that a homogenous layer of uniform thickness or a layer with a specific change in thickness is sprayed. It is also possible for the substrate to be provided (and coated) with a mask, particularly a perforated mask, so that the coating on the substrate is structured.

One advantageous method is to produce a catalyst concentration profile by dividing the areas of the substrate to be coated into regions that can be individually and differently coated and which differ from each other in the concentration and/or layer thickness and/or type and/or grain and/or porosity of the coating of the catalyst material.

Another advantageous embodiment of the method comprises coating the substrate in several sequential steps. For one thing, the layer thickness can be defined in this way. For another, in an improvement on the method, the composition and/or the type of the catalyst material can be changed advantageously between two sequential coating steps. This makes it readily possible for the geometric properties and/or chemical activity of the catalytic converter to be matched to widely varying applications.

Substrate bodies with complex structures can be coated true to the contour, and it is also possible to coat large surface areas homogeneously. The substrate to be coated does not have to be absorbent. In particular, it is possible to coat substrates that are nonoxidizable or not readily oxidizable, such as aluminum-free stainless steel (VA), with catalyst material.

Other objects, advantages and novel features of the present invention will become apparent from the following detailed description of the invention when considered in conjunction with the accompanying drawings.

DETAILED DESCRIPTION OF THE DRAWINGS

The method according to the present invention is suitable for manufacturing catalyst layers from various types of substrates and basic body geometries. It is particularly advantageous when manufacturing catalytic converters that are to be placed in catalytically operating reactors in which a uniform energy is applied or removed per unit area, such as combined reactors in which reaction processes that supply energy and consume energy take place simultaneously. The method according to the present invention is particularly advantageous for the compact, space-saving reactors known as "combireactors" which can be used for fuel preparation and/or gas purification in motor vehicles operated by fuel cells. The method is also particularly suitable for substrates with complex geometries and, in particular, for coating heat exchanger plates or catalytic burners for fuel cell systems.

Traditional exhaust gas catalytic converters are also significantly improved by using coatings produced by the method according to the present invention.

The catalytic converters manufactured according to the present invention can tolerate high heat and mechanical stresses. In motor vehicle exhaust gas catalytic converters with traditional dip coatings, only about 30% of the coating is still present after a few hundred hours of operation. In a catalytic converter manufactured according to the present invention, there is no detectable layer loss after approximately 800 hours of operation at comparable operating temperatures of approximately 1000° C.

Figure 1:
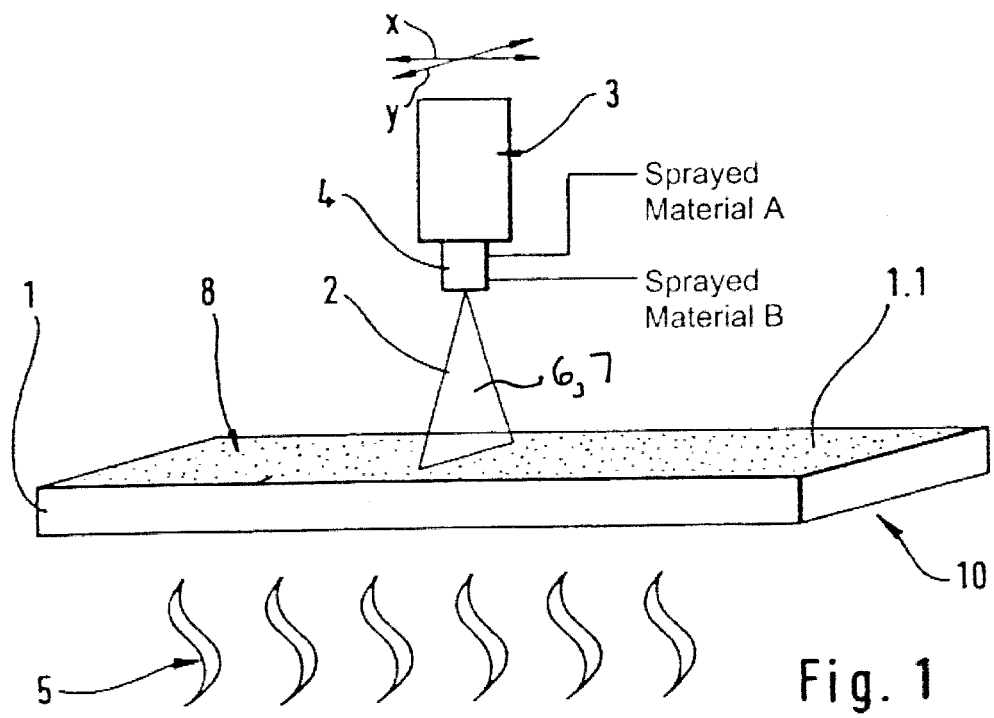
FIG. 1 is a schematic diagram of a method according to the present invention for manufacturing a catalytic converter having two material components with a substrate to be coated in cross section.

FIG. 1 is a schematic diagram of a coating process during a method according to the present invention for manufacturing a catalytic converter 10, in which sprayed material 2, composed of catalyst material 7 mixed with solvent 6, is sprayed onto a metal substrate 1 by means of a sprayer 3.

Two materials A and B can be mixed at the outlet 4 of sprayer 3. The mixture forms sprayed material 2. A layer 8 forms on substrate surface 1.1 to be coated as the sprayed material 2 is deposited.

In one advantageous embodiment, materials A and B can be different catalyst materials with different catalytically active components, each component being mixed with its usual binder system and a suitable solvent. The binder contents and/or solvent contents can be different. In another advantageous embodiment, the first component A is a mixture of catalyst material, binder, and solvent and the second component B is only (1) the same or another binder system, or (2) another carrier material without a catalytically active material coating. This makes it possible, during coating, to alter the chemical activity, grain size and/or strength of the coating.

If several binders are mixed in catalyst material 7, a stronger, mechanically robust layer 8 forms on substrate 1. If less binder is added, the layer is less solid, but is better able to withstand thermal shock. By changing the mixing proportion between components A and B in a coating process, the coating can be adapted to the predicted heat stress on the substrate during operation, for example.

Substrate 1 and sprayer 3 can move laterally with respect to each other, as shown by the arrows in the x and y directions in the figure. The lateral movement can be stepwise or continuous.

Substrate 1 is heated by a heat source 5 to a temperature T at which solvent 6 evaporates rapidly. It is advantageous for temperature T to be at least the boiling point of solvent 6. On the other hand, the temperature T can be relatively low, and may be in the vicinity of the boiling point. Sprayed material 2 dries rapidly on hot substrate 1, and a porous layer 8 of catalyst material 7 is left behind.

Figure 2:
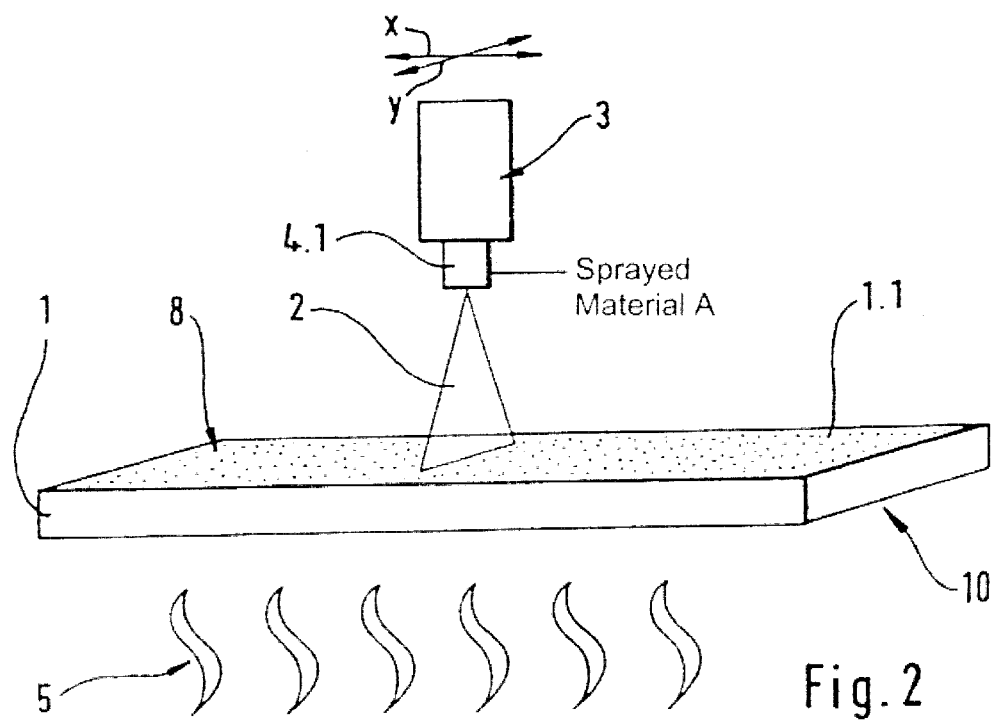
FIG. 2 is another schematic diagram of a method according to the present invention for manufacturing a catalytic converter having one material component with a substrate to be coated in cross section.

FIG. 2 is another schematic diagram of a coating method according to the present invention for manufacturing a catalytic converter 10. The structure largely corresponds to the system shown in FIG. 1.

A sprayed material 2, which consists of a mixture of solvent 6 with binder and catalyst material 7, is sprayed by a sprayer 3 onto a substrate. Sprayed material 2 comprising component A is conducted to the outlet area 4 of sprayer 3. A porous layer 8 forms on substrate surface 1.1 of heated substrate 1.

When catalyst material 7 and solvent 6 are mixed, the mixing ratio can vary widely. It is advantageous for the solvent content to match the grain size of the catalyst material and the type of sprayer nozzle used. A favorable range is a solvent proportion of 60 to 95 vol. %, but considerably less solvent can be added depending on the system.

Catalyst material 7 is preferably a powder which contains catalytically active material itself as a powder and/or as a coating on carrier particles. Preferred carrier particles are ceramic, metal, or plastic. Example include $Al_2O_3$, $SiO_2$, zeolite, $ZrO_2$, $CeO_2$, and/or mixtures thereof. Materials with a large surface area are favorable. Advantageously, catalyst material 7 is provided with a normal binder during spraying.

Suitable catalytically active materials are oxides such as Cu—Zn—O or metals such as noble metals or alloys (e.g., Ni and/or Pt, Pd, Ir, Rh, Ru, Cu, and/or mixtures thereof).

During or shortly after the solvent 6 to be evaporated reaches heated substrate 1, numerous micropores form in layer 8, so that coating 8 has a large active surface area. The particles of layer 8 attach essentially locally on impact and can match the exact contour of the surface of substrate 1 without forming undesirable layer thickening on unevenness on substrate 1. Substrate 1 can thus have any desired contour. Metal and/or ceramic is a favorable substrate material.

Advantageously, surface 1.1 to be coated is roughened before coating. This roughening can be done by a chemical etching process or by mechanical means such as sand blasting or grinding.

If a fabric such as a nonwoven fibers is used as substrate 1, the method according to the present invention is particularly advantageous. Catalyst material 7 surrounds the fibers of the fabric, matching its contours during spraying. The catalytic converters thus produced have a particularly large catalyst surface area on an essentially flexible substrate. With a normal dipping process, there is a danger of the catalyst material not penetrating evenly inside the fabric, and instead clogging the interior channels.

If catalyst material 7 is also provided with a binder, substrate 1 is then heated to another suitable temperature T', depending on the system used, to calcinate layer 8. This heat treatment activates the binder and wets the layer three-dimensionally. This improves the adhesion of layer 8 to itself and to substrate 1. Layer 8 is porous with micropores and macropores and adheres well to substrate 1.

The particle size of the catalyst material used can be chosen according to the desired strength and/or flexibility of the catalyst layer 8. When catalyst material 7 on carriers is used, the smaller the particle sizes of the carriers, the thicker and stronger is layer 8. Such layers 8 are particularly suitable for use with low heat stresses and high erosion stresses. If layer 8 will be exposed to high heat stresses, large particles are favorable, as different thermal expansion coefficients can be more easily compensated by layer 8.

A suitable catalyst material for preferred use in catalytically heated heat exchangers in fuel cell systems is platinum-coated $Al_2O_3$ with 5–10 wt. % platinum. A suitable binder is boehmite (Al—O—OH) or silicic acids.

However, it is possible to use any catalyst materials and binder systems that can be presented in powder form and processed by spraying. Appropriate binder and solvent systems can be selected and adjusted for the catalytically active materials. Favorable binder systems are ceramic precursors of carrier particle materials, if ceramic carrier materials or silicic acid, acetates, and nitrates are used.

The solvent content, binder ratio, and particle size can be varied over wide ranges and can be optimized according to the desired porosity of the coating and/or layer thickness and/or thermal and/or mechanical strength of the catalytic converter and for the selected sprayer.

When the catalytic converter will be heat-stressed in operation at or over 1000° C., advantageous particle sizes for the carrier or catalyst material are between 5 and $10\mu$. For temperatures less than 1000° C., particle sizes between 1 and $3\mu$ are favorable. A favorable layer thickness of catalyst layer 8 is approximately 10 to $40\mu$. The layer thickness can however be adjusted as necessary for the application in view. Solderability of the substrates increases with increasing particle size of the carrier particles. Preferably, particle sizes starting at approximately $10\mu$ are used for the substrate to be soldered after coating.

By contrast to the usual dip coats, the thickness of catalyst layer 8 may be quite small in a single coating step. Also, by comparison to the method in DE 16 42 921, application to substrate 1 can be precisely defined and closely controlled. In a single coating process, it is possible to apply a coating whose thickness is a maximum of approximately twice the average particle size of catalyst material 7. With a correspondingly fine-grained starting material, very thin layers (e.g., approximately $1\mu$) can be deposited in a single coating step. If a larger layer thickness is desired, several coating steps can be carried out one after the other.

Solvent systems that form suspensions with catalyst material 7 are particularly suitable for solvent 6, and polar solvent systems are particularly suitable. Water or high-boiling alcohols are particularly suitable. Water has the major advantage of not being flammable and being environmentally harmless so that no special measures have to be taken when spraying, heating, or disposing of waste products.

When water is used as solvent 6, preferred substrate temperatures when spraying are between 150° C. and 300° C. Favorable binder contents in the sprayed material 2 are 5 wt. % to 40 wt. % (weight percent), with a binder ratio of 7 wt. % to 30 wt. % being especially preferred, the weight percentages being based on the catalyst material on carriers. The more binder is added, the thicker is layer 8. Such layers 8 are highly resistant to erosion but somewhat less tolerant to heat stresses than thinner layers 8.

In principle, all spraying methods and sprayers in which the sprayed material can be atomized can be used. Various sprayers are known, for example, from painting technology and are in principle suitable for the method according to the present invention.

With so-called air atomizers, a solids content of 5% to a maximum of 50% is favorable. With the so-called airless atomizers, a higher solids ratio of approximately 50% is favorable. The optimum solids ratio in each case depends on various parameters, the selected nozzle, and the particle size of sprayed material 2 to be processed. The particle size of sprayed material 2 can vary over broad ranges such as $0.3\mu$ to $50\mu$ with commercial nozzles. The layer thickness can accordingly be matched to the application in view.

One particular advantage is that the coating method is a very gentle method which does not limit the catalytic activity of the catalyst material by coating. The porosity of the applied layer depends essentially on the porosity of the carrier material.

Figure 3A:
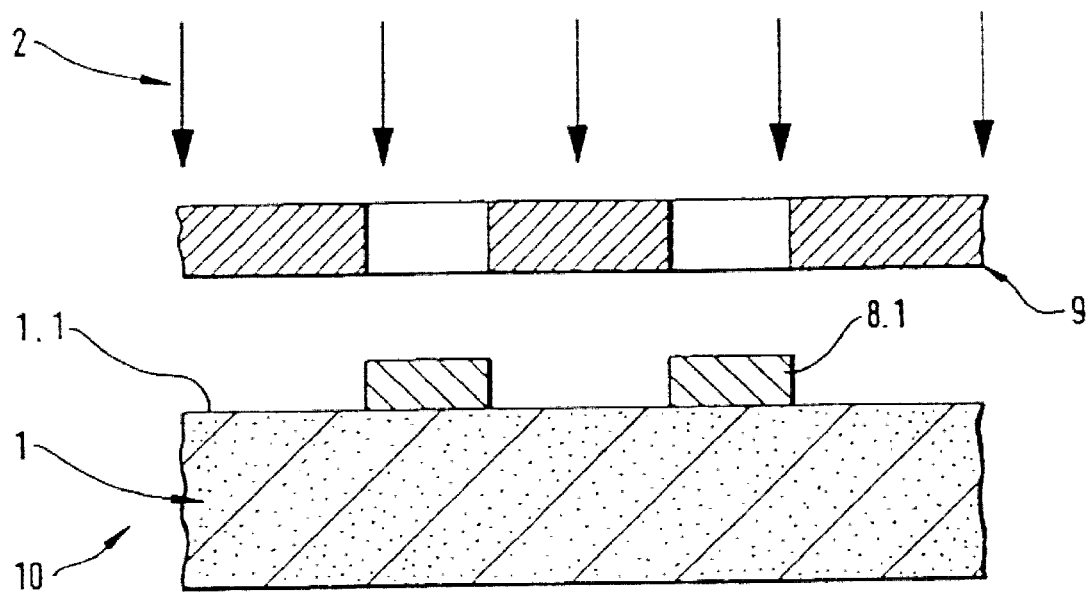
FIG. 3(a) is a schematic view of a section through a coated substrate with a structured surface showing deposition of a first partial layer.

FIGS. 3(a) and (b) are cross sections through a catalytic converter 10 which has a laterally structured catalyst layer 8. In FIG. 3(a), surface 1.1 is coated with sprayed material through a perforated mask 9. Layer areas 8.1 are deposited through the holes in the mask. These are areas are separated by substrate areas that are not coated. Catalyst layer 8 now consists of catalytically active islands 8.1 on substrate 1.

Figure 3B:
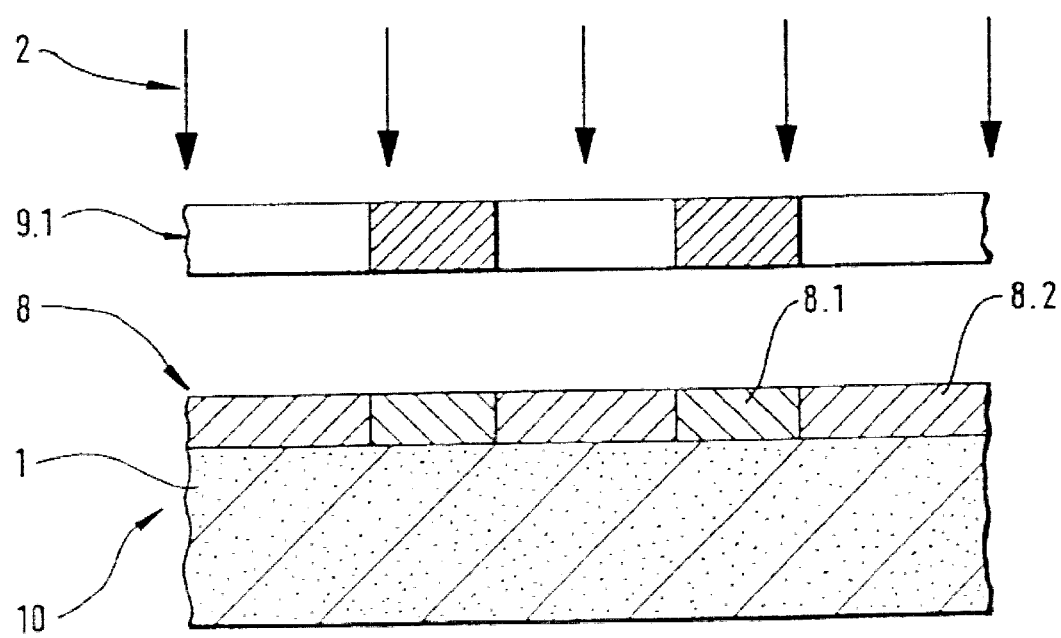
FIG. 3(b) is a schematic view of a section through a coated substrate with a structured surface showing deposition of a complete layer.

In FIG. 3(b), sprayed material 2 is deposited on the same substrate 1 through a complementary mask, and catalyst material 7 is deposited between islands 8.1 of FIG. 3(a) as layer areas 8.2. This material can be different from the material of islands 8.1 either chemically and/or in terms of particle size, thickness, and/or other physical parameters. Catalyst layer 8 is now formed of a closed layer with locally different, structured properties that are predetermined.

Figure 4A:
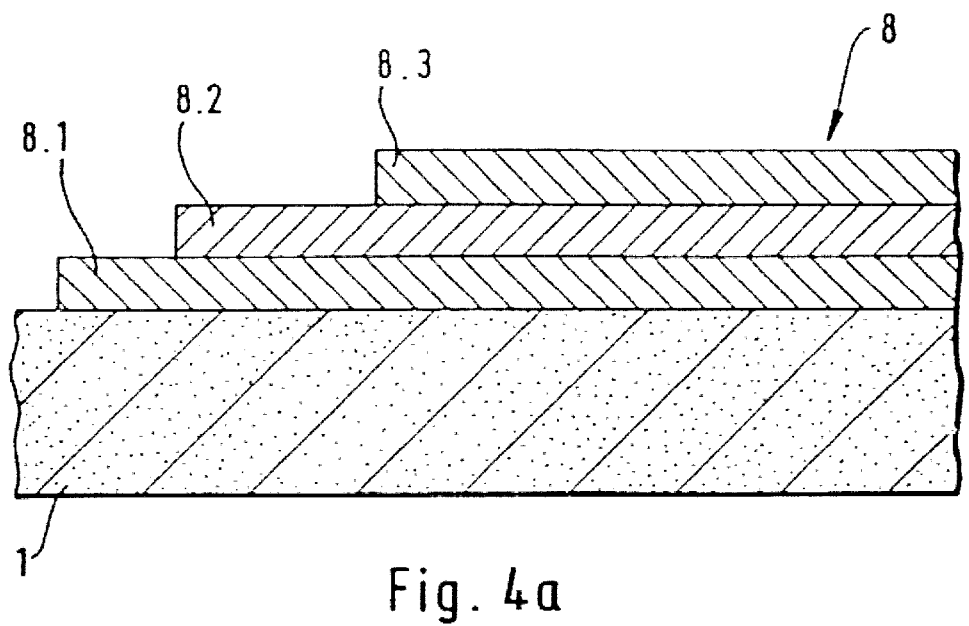
FIG. 4(a) is a schematic view of a section through a coated substrate with different layer thicknesses showing a coating with stepwise increases.

FIGS. 4(a) and (b) are diagrams of a catalytic converter 10 made according to the present invention, the coating of which varies vertically. In FIG. 4(a), the thickness of layer 8 increases stepwise as partial layers 8.1, 8.2, 8.3 build up. This can be done by a mask technique analogously to the method in FIGS. 3(*a*) and (*b*) or by moving sprayer 3 relative to substrate 1 in steps. The partial layers can be made of the same type of material but can also be made of different material. One favorable embodiment is for several partial layers 8.1, 8.2, 8.3 with different catalyst material 7 and/or different catalytic activity to be disposed laterally offset on top of one another.

Figure 4B:
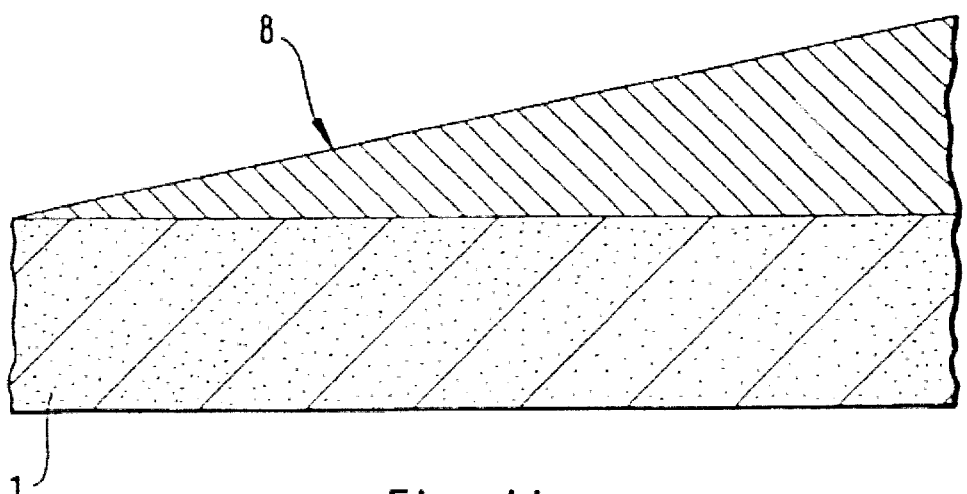
FIG. 4(b) is a schematic view of a section through a coated substrate with different layer thicknesses showing a continuous increase in layer thickness.

In FIG. 4(*b*), a catalyst layer 8 is formed on a substrate 1, the thickness of which increases continuously. This can be achieved by altering the feed rate between sprayer 3 and substrate 1.

It is also possible to make a catalytic converter 10 whose properties vary both laterally and vertically. Individual or several coating steps as shown in FIGS. 3 and 4 can be combined with one another for this purpose. A layer 8 can be made whose thickness and catalytic activity changes gradually or stepwise along substrate 1.

It is particularly advantageous to make a catalyst layer by the method according to the present invention which is preferably homogenous per se but has a specific, imposed profile of catalytic activity along the length of the catalytic converter. For a catalytic burner in a fuel cell system, it is advantageous for the catalytic activity to be small at the inlet of the catalytic converter and, for example, to increase exponentially along the length. This can easily be accomplished or at least approximated with the method according to the present invention by depositing catalyst material in strips. Of course, another catalytic activity profile can be produced by increasing the activity linearly or quadratically.

In each case, the content of catalytically active material in the sprayed material can be changed from one strip to the next, while the other properties such as particle size of carrier material, layer thickness, binder content of sprayed material, and the like remain the same. The thinner the strips, the more closely the catalytic activity of the layer matches the desired activity profile along the length.

Another possibility in using a sprayer according to FIG. 1 is to change the mixing ratio of components A and B during the coating process. This method step, too, can be combined with the method steps of FIGS. 3 and 4.

In a preferred method, a suspension of catalyst material, binder, and water is made (e.g., 50 g catalyst, 7.5 g binder, and 200 ml water). This is then ground (e.g., 1–2 h) until the desired carrier particle size is reached. The suspension is poured into the sprayer and sprayed onto a substrate 1 heated to 250–300° C. After coating, the substrate is held for about 2 hours at about 500° C. to calcinate. This can be done in a vacuum or controlled atmosphere.

Especially preferably, the method for manufacturing catalytic converters is used in fuel cell systems (1) for catalytic oxidation in catalytic burners, (2) for partial oxidation of combustible substances such as methanol, (3) for selective oxidation of CO for example, (4) for the water-gas shift reaction and for steam reforming, and/or (5) for making the electrodes of the fuel cells themselves. It is particularly advantageous that hydrogen-tight stainless steel substrates can be coated with catalyst materials on which the catalytic layer cannot be made to adhere sufficiently with other coating methods.

Preferably, units or at least components for reformers and/or shift stages and/or catalytic burners and/or carbon monoxide oxidation units and/or afterburner units for fuel cell systems are made with the method according to the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for manufacturing a catalytic converter, comprising:

heating a substrate;

spraying a suspension comprising a solvent vehicle and a catalyst comprising carrier particles coated with a catalytically active material onto the heated substrate, wherein the temperature of the substrate is above the boiling point of the solvent vehicle, thereby evaporating the solvent vehicle when it touches the heated substrate; and forming a layer of catalytically active material on said substrate.

2. A method according to claim 1, wherein said suspension comprises 60 to 95 volume percent of said solvent.

3. A method according to claim 1, wherein said solvent is water.

4. A method according to claim 1, wherein said suspension further comprises 5 to 40 wt. % of a binder.

5. A method according to claim 1, wherein said carrier particles comprise a binder.

6. A method according to claim 1, further comprising moving said substrate and said sprayer relative to one another during said spraying.

7. A method according to claim 1, further comprising changing a composition of said suspension during said spraying.

8. A method according to claim 1, wherein said layer has a predetermined changing thickness.

9. A method according to claim 1, further comprising masking said substrate, thereby forming said layer locally on said substrate.

10. A method according to claim 1, further comprising spraying said substrate in a plurality of steps, in which for each step at least one of the composition, particle size, density and thickness of the catalyst is changed.

11. A method according to claim 1, further comprising roughening said substrate before said spraying.

12. A method according to claim 1, wherein said substrate comprises a body selected from the group consisting of metal, plastic, and fabric.

13. A method according to claim 1, wherein said layer has a thickness that is approximately twice an average particle size of the catalyst.

14. A method according to claim 1, further comprising incorporating said catalytic converter into a fuel cell.

15. A method according to claim 14, wherein said incorporating comprises depositing said layer on a chromium steel body.

16. A method according to claim 1, wherein said layer of catalytically active material is porous.

17. A method according to claim 1, wherein said carrier particles is selected from the group consisting of $Al_2O_3$, $SiO_2$, zeolite, $ZrO_2$, $CeO_2$, and mixtures thereof.

18. A method according to claim 1, wherein said catalytically active material is Cu—Zn—O or platinum-coated $Al_2O_3$.

19. A method according to claim 1, wherein said catalytically active material is selected from the group consisting of a metal or alloy of a metal selected from the group consisting of Ni, Pd, Ir, Rh, Ru, Cu, and mixtures thereof.

20. A method according to claim 1, wherein said evaporating fixes the catalytic material locally on the substrate so that it cannot creep or flow.

21. A method according to claim 1, wherein said catalytic material is a powder of a supported or unsupported catalyst.

22. A method for manufacturing a catalytic converter, consisting essentially of:

heating a substrate;

spraying a suspension comprising a solvent vehicle and a catalyst comprising carrier particles coated with a catalytically active material onto the heated substrate, wherein the temperature of the substrate is above the boiling point of the solvent vehicle, thereby evaporating the solvent vehicle when it touches the heated substrate; and forming a layer of catalytically active material on said substrate.

* * * * *